US010999244B2

(12) United States Patent
Mittal et al.

(10) Patent No.: US 10,999,244 B2
(45) Date of Patent: May 4, 2021

(54) MAPPING A SERVICE INTO A VIRTUAL NETWORK USING SOURCE NETWORK ADDRESS TRANSLATION

(71) Applicant: MICROSOFT TECHNOLOGY LICENSING, LLC, Redmond, WA (US)

(72) Inventors: Sumeet Mittal, Woodinville, WA (US); Abhishek Shukla, Redmond, WA (US); Rishabh Tewari, Sammamish, WA (US); Qiming Chen, Redmond, WA (US); Harish Kumar Chandrappa, Bothell, WA (US); Pranjal Shrivastava, Redmond, WA (US); Anitha Adusumilli, Redmond, WA (US); Parag Sharma, Issaquah, WA (US); Abhishek Ellore Sreenath, Bangalore (IN)

(73) Assignee: Microsoft Technology Licensing, LLC, Redmond, WA (US)

( * ) Notice: Subject to any disclaimer, the term of this patent is extended or adjusted under 35 U.S.C. 154(b) by 60 days.

(21) Appl. No.: 16/262,626

(22) Filed: Jan. 30, 2019

(65) Prior Publication Data

US 2020/0099656 A1 Mar. 26, 2020

(30) Foreign Application Priority Data

Sep. 21, 2018 (IN) .............................. 201841035632

(51) Int. Cl.
*H04L 29/12* (2006.01)
*H04L 29/08* (2006.01)
(52) U.S. Cl.
CPC ........ *H04L 61/256* (2013.01); *H04L 61/2539* (2013.01); *H04L 61/2592* (2013.01);
(Continued)

(58) Field of Classification Search
CPC ............... H04L 61/256; H04L 61/2539; H04L 61/2592; H04L 61/6068; H04L 67/1002
(Continued)

(56) References Cited

U.S. PATENT DOCUMENTS 7,277,453 B2  10/2007  Chin et al.
8,958,293 B1   2/2015  Anderson
(Continued)

FOREIGN PATENT DOCUMENTS

CN          103188339 B    8/2016

OTHER PUBLICATIONS

Patel, et al., "Ananta: Cloud Scale Load Balancing", In Proceedings of ACM SIGCOMM Computer Communication Review vol. 43, No. 4, Aug. 27, 2013, pp. 207-218.
(Continued)

*Primary Examiner* — Meng Vang
(74) *Attorney, Agent, or Firm* — Newport IP, LLC; Jacob P. Rohwer (57) ABSTRACT

The techniques described herein enable a private connectivity solution between a virtual network of a service consumer and a virtual network of a service provider in a cloud-based platform. The techniques map a service (e.g., one or more workloads or containers) executing in the virtual network of the service provider into the virtual network of the service consumer. The mapping uses network address translation (NAT) that is performed by the cloud-based infrastructure. As a result of the techniques described herein, a public Internet Protocol (IP) address does not need to be used to establish a connection thereby alleviating privacy and/or security concerns for the virtual networks of the service provider and/or the service consumer that are hosted by the cloud-based platform.

20 Claims, 5 Drawing Sheets (52) U.S. Cl.
CPC ...... *H04L 61/6068* (2013.01); *H04L 67/1002* (2013.01); *H04L 2212/00* (2013.01)

(58) Field of Classification Search
USPC .......................................................... 709/245
See application file for complete search history.

(56) References Cited

U.S. PATENT DOCUMENTS

| | | |
|---|---|---|
| 9,019,965 B2 | 4/2015 | Kassi Lahlou et al. |
| 9,794,215 B2 | 10/2017 | Dinha |
| 2007/0081512 A1* | 4/2007 | Takeda .................. H04L 69/167 370/349 |
| 2009/0199177 A1 | 8/2009 | Edwards et al. |
| 2011/0103394 A1* | 5/2011 | Vogt .................... H04L 61/2557 370/401 |
| 2014/0317313 A1* | 10/2014 | Okita .................. H04L 61/2557 709/245 |
| 2015/0071171 A1* | 3/2015 | Akiyoshi .............. H04L 45/586 370/328 |
| 2015/0188818 A1* | 7/2015 | Alkhatib ............. H04L 61/2007 370/392 |
| 2015/0195196 A1 | 7/2015 | Patel |
| 2017/0272316 A1* | 9/2017 | Johnson ................ H04L 67/141 |
| 2017/0272400 A1 | 9/2017 | Bansal et al. |
| 2018/0139101 A1 | 5/2018 | Puri et al. |
| 2019/0372908 A1* | 12/2019 | Featonby ............ H04L 67/1095 |

OTHER PUBLICATIONS

"International Search Report and Written Opinion Issued in PCT Application No. PCT/US19/039097", dated Sep. 16, 2019, 12 Pages.

"Amazon Virtual Private Cloud—VPCs and Subnets", Retrieved From: https://docs.aws.amazon.com/vpc/latest/userguide/VPC_Subnets.html, Retrieved Date: Dec. 26, 2018, 12 Pages.

* cited by examiner

MAPPING A SERVICE INTO A VIRTUAL NETWORK USING SOURCE NETWORK ADDRESS TRANSLATION

PRIORITY APPLICATION

This application claims the benefit of and priority to Indian (IN) Provisional Application No. 201841035632, filed Sep. 21, 2018, the entire contents of which are incorporated herein by reference.

BACKGROUND

Cloud-based platforms (e.g., AMAZON WEB SERVICES, MICROSOFT AZURE, etc.) enable tenants (e.g., customers) to offer and/or to consume services via their virtual networks. To do this, a virtual network of a service provider, that is hosted by a cloud-based platform, needs to connect to a virtual network of a service consumer that is also hosted by the cloud-based platform. Typically, this connection is established using a public Internet Protocol (IP) address, which causes privacy and/or security concerns for the virtual networks of the service provider and/or the service consumer that are hosted by the cloud-based platform.

It is with respect to these and other technical challenges that the disclosure made herein is presented.

SUMMARY

The techniques described herein enable a private connectivity solution between a virtual network of a service consumer and a virtual network of a service provider in a cloud-based platform (e.g., AMAZON WEB SERVICES, MICROSOFT AZURE, etc.). The techniques map a service (e.g., one or more workloads or containers) executing in the virtual network of the service provider into a virtual network of the service consumer. The mapping uses network address translation (NAT) that is performed by the cloud-based infrastructure. As a result of the techniques described herein, a public Internet Protocol (IP) address does not need to be used to establish a connection thereby alleviating the privacy and/or the security concerns for the virtual networks of the service provider and/or the service consumer that are hosted by the cloud-based platform.

An internal load balancer is configured in association with the virtual network of the service provider. For instance, an entity (e.g., a customer) that provides the service can configure an internal load balancer to scale a service across multiple virtual machines operating within its virtual network and/or to distribute workloads across multiple resources. Thus, the load balancing optimizes resource use, maximizes throughput, minimizes response time, and avoids overload of any single resource. The internal load balancer described herein is assigned a routable IP address, which is a physical IP address. The routable IP address is used by networking components of the cloud-based platform to route traffic on a network of the cloud-based platform. The internal load balancer is also assigned a customer IP address. The customer IP address is a private virtual IP address that is only visible to virtual machines within the virtual network of the service provider.

In order to map the service executing in the virtual network of the service provider into the virtual network of the service consumer, subnets (e.g., a collection of IP addresses) are created. That is, the service provider creates and allocates a subnet in its virtual network and the service consumer creates and allocates a subnet in its virtual network. The subnets represent endpoints to a secure communication channel between the virtual networks. Consequently, the virtual machines in the virtual network of the service consumer believe they are sending data packets to, and/or receiving data packets from, an endpoint in their own virtual network when consuming the service. Moreover, the virtual machines in the virtual network of the service provider believe they are sending data packets to, and/or receiving data packets from, an endpoint in their own virtual network when providing the service.

After the subnets are created, the techniques described herein determine that a data packet is being communicated from a source IP address associated with a virtual machine in the virtual network of the service consumer to a destination IP address associated with the subnet that has been created in the virtual network of the service consumer. Accordingly, it appears, to the virtual machine, that the data packet is being communicated within the same virtual network (i.e., the virtual network of the service consumer). This determination that a data packet is being communicated can be made by networking components of a physical machine (e.g., a server) of the cloud-based platform that is supporting the virtual network of the service consumer (e.g., the virtual machine where the data packet originates). A physical machine that is part of the cloud-based platform may be referred to herein as a "host node".

The host node that determines that a data packet is being communicated is aware of the routable IP address of the internal load balancer configured in association with the virtual network of the service provider. For instance, networking components of the host node are informed of a policy (e.g., a condition match/action rule) to translate an IP address associated with the subnet in the virtual network of the service consumer to the routable IP address of the internal load balancer configured in association with the virtual network of the service provider. In various examples, the policy, and therefore, the routable IP address, can be accessed via a publication subscription component of the cloud-based platform. Example networking components of a host node that implement the techniques described herein can include one or more of a host networking agent (e.g., NMAgent), a virtual switch (e.g., vSwitch), the Virtual Filtering Platform ("VFP"), etc.

The host node is configured to replace the destination IP address in the data packet with the routable IP address of the internal load balancer. The host node can then communicate the data packet over the physical network of the cloud-based platform via the routable IP address of the internal load balancer. That is, the host node can communicate the data packet to another host node of the cloud-based platform that supports the internal load balancer configured in association with the virtual network of the service provider. To this end, the other host node that supports the internal load balancer receives the data packet.

The communication of the data packet using the routable IP address allows the internal load balancer to implement its load balancing functionality. For instance, the internal load balancer can select a virtual machine in the virtual network of the service provider to receive the data packet (e.g., to handle a request). The host node that supports the internal load balancer is configured to translate, using a network address translation (NAT) table, the IP addresses in the communicated data packet into IP addresses associated with the virtual network of the service provider. For example, the host node translates the original source IP address in the data packet into a source IP address associated with the subnet created in the virtual network of the service provider. In this way, when the data packet is communicated to a destination within the virtual network of the service provider, it appears that the data packet originates within the same virtual network (i.e., the virtual network of the service provider). Furthermore, the host node translates the original source port number to a source port number selected from a pool of port numbers useable in the virtual network of the service provider. This addresses a situation where two different virtual machines of one or multiple service consumers initiate a connection with a same source port number. Given this situation, the same source port number used by the two different virtual machines is translated into two unique port numbers in the virtual network of the service provider.

The host node supporting the internal load balancer also translates the routable IP address of the internal load balancer in the data packet into the customer IP address of the internal load balancer. Then, the customer IP address is translated into a destination IP address (e.g., a "final" destination IP address) associated with the virtual machine in the virtual network of the service provider that has been selected to receive the data packet. In some instances, the internal load balancer selects a destination port number associated with the virtual machine in the virtual network of the service provider and the host node supporting the internal load balancer translates a an original destination port number in the data packet into the destination port number associated with the virtual machine in the virtual network of the service provider. The data packet can then be communicated to the virtual machine in the virtual network of the service provider using the final destination IP address and/or the destination port number.

In various embodiments, a host node of the cloud-based platform can perform network functions in association with communicating the data packet from the virtual network of the service consumer to the virtual network of the service provider, and vice versa. For example, the host nodes can perform encapsulation/de-encapsulation ("encap/decap") functionality. That is, the host node supporting the virtual network of the service consumer (e.g., the virtual machine where a data packet originates) can encapsulate the data packet with a header and the host node supporting the virtual network of the service provider (e.g., the internal load balancer) can de-encapsulate the data packet.

In another example, the IP addresses of the original data packet generated by the virtual machine of the service consumer may be Internet Protocol version 4 (IPv4) addresses, and a host node supporting the virtual network of the service consumer can convert the IPv4 addresses into Internet Protocol version 6 (IPv6) addresses.

In a further example, the host node supporting the virtual network of the service consumer can embed a general routing encapsulation key (e.g., a GRE Key) into the data packet. The general routing encapsulation key uniquely identifies the virtual network of the service consumer. Consequently, the general routing encapsulation key can be used to ensure a reply data packet is sent back to the correct virtual network. In some instances, the embedding of the general routing encapsulation key can occur with the conversion of the IPv4 addresses into the IPv6 addresses.

This Summary is provided to introduce a selection of concepts in a simplified form that are further described below in the Detailed Description. This Summary is not intended to identify key or essential features of the claimed subject matter, nor is it intended to be used as an aid in determining the scope of the claimed subject matter. The term "techniques," for instance, may refer to system(s), method(s), computer-readable instructions, module(s), component(s), algorithm(s), hardware logic, and/or operation(s) as permitted by the context described above and throughout the document.

BRIEF DESCRIPTION OF THE DRAWINGS

The detailed description is described with reference to the accompanying figures. In the figures, the left-most digit(s) of a reference number identifies the figure in which the reference number first appears. The same reference numbers in different figures indicate similar or identical items.

DETAILED DESCRIPTION

The techniques described herein enable a private connectivity solution between a virtual network (e.g., a VNET) of a service consumer and a virtual network of a service provider in a cloud-based platform (e.g., AMAZON WEB SERVICES, MICROSOFT AZURE, etc.). The techniques map a service (e.g., one or more workloads or containers) executing in the virtual network of the service provider into a virtual network of the service consumer. The mapping uses network address translation (NAT) that is performed by the cloud-based infrastructure. As a result of the techniques described herein, a public Internet Protocol (IP) address does not need to be used to establish a connection thereby alleviating the privacy and/or the security concerns for the virtual networks of the service provider and/or the service consumer that are hosted by the cloud-based platform.

A cloud-based platform may host virtual networks for a number of different tenants, or customers. In various examples, a virtual network is a representation of a tenant's own network in a cloud-based platform. In some instances, the virtual network can be an extension of the tenant's own private network (e.g., an on-premises datacenter network). The virtual network provides an isolated environment for a tenant to run a workload. A virtual network can implement one or more virtual machines to run the workload. In various examples, a virtual machine provides functionality to execute an operating system. A hypervisor in the cloud-based platform can use the functionality to share and manage hardware, allowing for multiple different isolated environments to exist on a same physical machine (e.g., a server that is part of the cloud-based platform).

A container is an isolated and resource-controlled operating environment. A software application (e.g., a workload) can run in a container without affecting the rest of the system and without the system affecting the application. A container may be specific to one application, or may provide the runtime for multiple applications, providing additional operating system functions and services (e.g. input/output functions, security, etc.). Moreover, a container can be portable and/or mobile. Containers introduce additional levels of abstraction to a network (e.g., a datacenter network operated by a cloud-based platform), thereby increasing the complexity of the networking infrastructure. In a specific example, a host node may have a physical IP address and a virtual machine executing within the host node may have a virtual IP address. Network Virtualization Functions (NVF) in the host node may be used to encapsulate and/or de-encapsulate ("encap/decap") packets and/or to translate addresses from one layer of abstraction to another and/or between physical and virtual layers.

Accordingly, the techniques described herein use networking aspects of a cloud-based platform to map a service (e.g., a workload, a container, etc.) executing in a virtual network of a tenant that provides the service into a virtual network of a tenant that consumes the service. The mapping uses network address translation (NAT) that is performed by the cloud-based infrastructure that supports the virtual network of the service provider. Stated another way, the virtual network of the service provider is the "source" of the network address translation.

Figure 1:
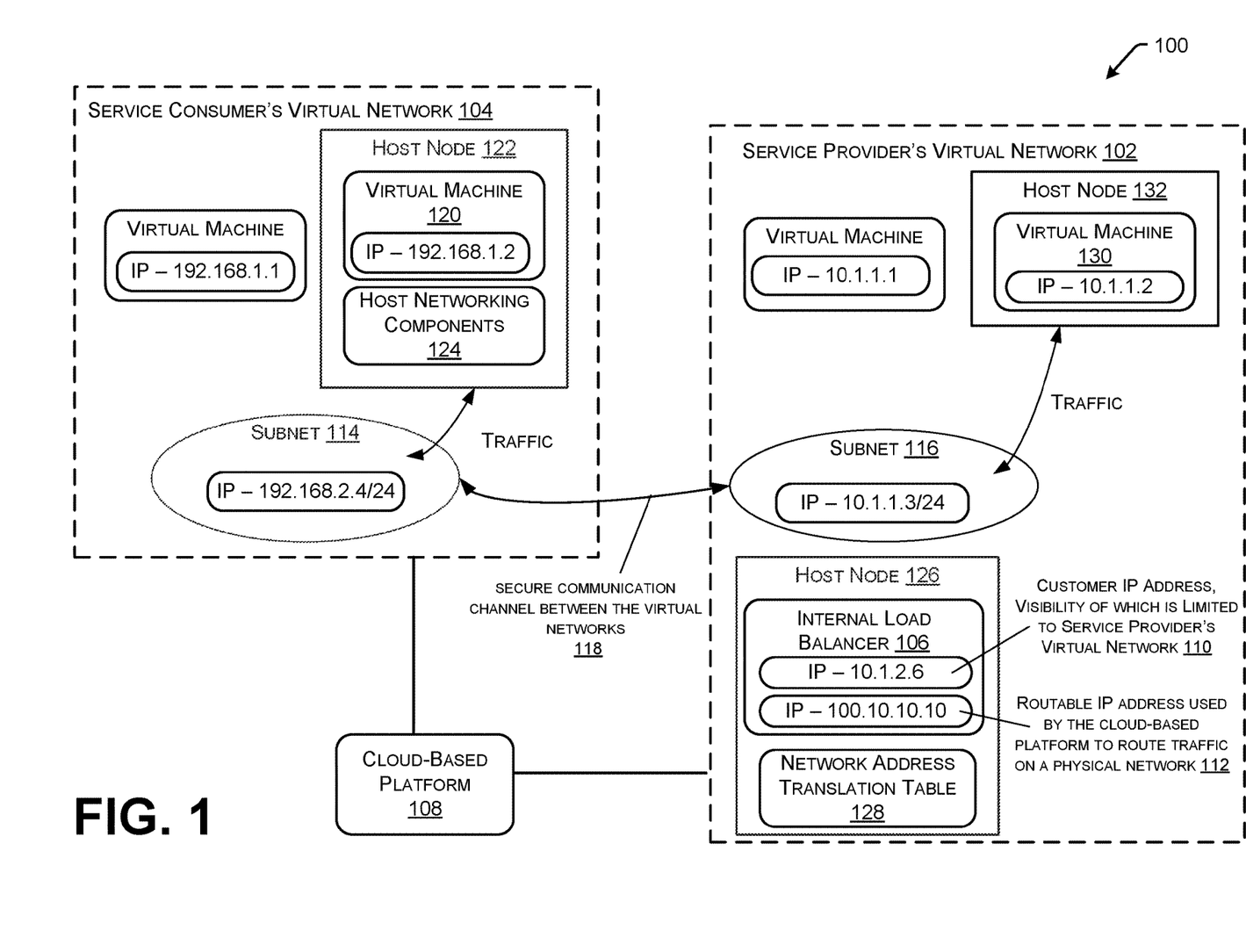
FIG. 1 illustrates an example environment in which a service (e.g., one or more workloads or containers) executing in a virtual network of a service provider is mapped into a virtual network of a service consumer.

FIG. 1 illustrates an example environment 100 in which a service (e.g., one or more workloads or containers) executing in a virtual network of a service provider 102 is mapped into a virtual network of a service consumer 104. As described above, an internal load balancer 106 is configured in association with the virtual network of the service provider 102. The internal load balancer 106 is configured to scale the service across a number of virtual machines (e.g., two, five, ten, twenty, etc.) that are capable of executing the service within the virtual network of the service provider 102, such that the service can be exposed to multiple different service consumers. The infrastructure of a cloud-based platform 108 isolates different virtual networks of the multiple different service consumers thereby enabling the different service consumers to use the same or overlapping IP address space.

The internal load balancer 106 is assigned a customer IP address (CA) (e.g., "10.1.2.6" as shown in FIG. 1). The load balancer is "internal" because the customer IP address is only visible within its own virtual network, as referenced by 110. Further, the internal load balancer 106 is assigned a routable IP address (e.g., "100.10.10.10" as shown in FIG. 1). The routable IP address is an actual address known to, and used by, the cloud-based platform 108 to route data traffic on a physical network, as referenced by 112.

To implement the mapping, a subnet 114 (e.g., "192.168.2.4/24" as shown in FIG. 1) is created in the virtual network of the service consumer 104 and a corresponding subnet 116 (e.g., "10.1.1.3/24" as shown in FIG. 1) is created in the virtual network of the service provider 102. These subnets are created so that the virtual machines executing in the respective virtual networks think they are communicating within their own virtual network when providing or consuming the service. Consequently, the subnets 114 and 116 represent endpoints to a secure communication channel between the virtual networks, as referenced by 118.

When one of multiple virtual machines (e.g., virtual machine 120) in the virtual network of the service consumer 104 sends a data packet, referred to as "traffic" in FIG. 1, via a source IP address (e.g., "192.168.1.2" as shown in FIG. 1) to a destination IP address (e.g., "192.168.2.4") within the subnet 114 allocated to the service being consumed by the virtual network 104, the underlying infrastructure implemented in a host node 122 of the cloud-based platform 108 associates the destination IP address (e.g., "192.168.2.4") with the internal load balancer 106. The underlying infrastructure comprises host networking components 124 such as a host networking agent (e.g., NMAgent), a virtual switch (e.g., vSwitch), the Virtual Filtering Platform ("VFP"), etc. As described herein, operations performed "by a host node" may be operations performed by the host networking components of a host node.

The host node 122 replaces the destination IP address (e.g., "192.168.2.4") in the data packet with the routable IP address of the internal load balancer (e.g., "100.10.10.10"). In various examples, the host node 122 is aware of the routable IP address of the internal load balancer 106 because the host node 122 has been instructed to apply a policy (e.g., a condition match/action rule) to translate an IP address associated with the subnet 114 in the virtual network of the service consumer 104 into the routable IP address of the internal load balancer 106 configured within the virtual network of the service provider 102. In various examples, the policy, and therefore, the routable IP address, can be accessed via a publication subscription component of the cloud-based platform 108.

The host node 122 then communicates the data packet to the internal load balancer 106 using the routable IP address. That is, the host node 122 communicates the data packet to a host node 126 supporting the internal load balancer 106. Consequently, the host node 126 receives the data packet and the internal load balancer 106 is enabled to perform its load balancing functionality (e.g., select a destination for the data packet). Subsequently, the networking components of the host node 126 are configured to use a network address translation (NAT) table 128 to translate the source IP address (e.g., "192.168.1.2") in the data packet to a source IP address associated with the subnet 116 created in the virtual network of the service provider 102 (e.g., "10.1.1.3" as shown in FIG. 1). In this way, when the data packet is communicated to a destination within the virtual network of the service provider 102, it appears that the data packet originates within the same virtual network (i.e., the virtual network of the service provider).

In various examples, the host node 126 translates an original source port number to a source port number selected from a pool of port numbers useable in the virtual network of the service provider 102. This addresses a situation where two different virtual machines of one or multiple service consumers initiate a connection using a same source port number. Given this situation, the same source port number used by the two different virtual machines is translated into two unique "source" port numbers useable in the virtual network of the service provider 102.

The host node 126 also uses the NAT table 128 to translate the routable IP address (e.g., "100.10.10.10") in the data packet into an IP address within the virtual network of the service provider 102. For example, the routable IP address (e.g., "100.10.10.10") of the internal load balancer 106 may first be translated into the customer IP address (e.g., "10.1.2.6") of the internal load balancer 106. In this example, the customer IP address (e.g., "10.1.2.6") can subsequently be translated into a destination IP address (e.g., "10.1.1.2" as shown in FIG. 1) associated with the virtual machine 130 selected by the internal load balancer. The host node 126 can then communicate the data packet to the virtual machine 130 via a supporting host node 132. In some instances, the internal load balancer selects a destination port number associated with the virtual machine 130 in the virtual network of the service provider 102 and translates an original destination port number in the data packet into the destination port number associated with the virtual machine 130 in the virtual network of the service provider 102. In association with the virtualization techniques implemented in the cloud-based platforms, any two or more of host nodes 122, 126, and 132 may be the same.

In various embodiments, a host node of the cloud-based platform can perform network functions in association with communicating the data packet from the virtual network of the service consumer 104 to the virtual network of the service provider 102, and vice versa. For example, the host nodes can perform encapsulation/de-encapsulation ("encap/decap") functionality. That is, the host node 122 supporting the virtual network of the service consumer 104 can encapsulate the data packet with a header and the host node 126 supporting the virtual network of the service provider 102 can de-encapsulate the data packet.

In another example, the IP addresses of the original data packet generated by the virtual machine 120 of the service consumer 104 may be Internet Protocol version 4 (IPv4) addresses, and a host node 122 supporting the virtual network of the service consumer 104 can convert the IPv4 addresses into Internet Protocol version 6 (IPv6) addresses prior to communicating the data packet over a network of the cloud-based platform 108.

In a further example, the host node 122 supporting the virtual network of the service consumer 104 can embed a general routing encapsulation key (e.g., a GRE Key) into the data packet. The general routing encapsulation key uniquely identifies the virtual network of the service consumer 104, thereby enabling the different service consumers to use the same or overlapping IP address space. Consequently, the general routing encapsulation key can be used to ensure a reply data packet is sent back to the correct virtual network. In some instances, the embedding of the general routing encapsulation key can occur with the conversion of the IPv4 addresses into the IPv6 addresses.

Once the data packet has been communicated from the virtual machine 120 in the virtual network of the service consumer 104 to the virtual machine 130 in the virtual network of the service provider 102, as described above, similar translations can be used by the cloud-based infrastructure to communicate a reply data packet from the virtual machine 130 in the virtual network of the service provider 102 back to the virtual machine 120 in the virtual network of the service consumer 104. For example, the final destination IP address (e.g., "10.1.1.2") of the originally communicated data packet becomes the initial source IP address of a reply data packet and the original source IP address (e.g., "192.168.1.2") of the originally communicated data packet becomes the final destination IP address of the reply data packet.

A host node supporting the virtual network of the service provider 102 can use the same NAT table 128 to implement reply translations. For example, the source IP address in the reply data packet (e.g., "10.1.1.2") can be translated into a source IP address (e.g., "192.168.2.4") associated with the subnet 114 created in the virtual network of the service consumer 104. Moreover, the destination IP address (e.g., "10.1.1.3") in the reply data packet that is associated with the subnet 116 of the virtual network of the service provider 102 can be translated into a destination IP address (e.g., "192.168.1.2") associated with the virtual machine 120 in the virtual network of the service consumer 104. The host node can then communicate the reply data packet, with the translated IP addresses, to the virtual machine 120 in the virtual network of the service consumer 104. In various embodiments, the general routing encapsulation key is embedded in the reply data packet to ensure the reply data packet is routed back to the correct virtual network (i.e., the virtual network of the service consumer 104 from which the originally communicated data packet was received). Because the general routing encapsulation key uniquely identifies the virtual network of the service consumer 104, traffic can be routed back and a private communication channel between the two subnets 114, 116 is established by the cloud-based platform 108 without involving a public IP address.

Figure 2:
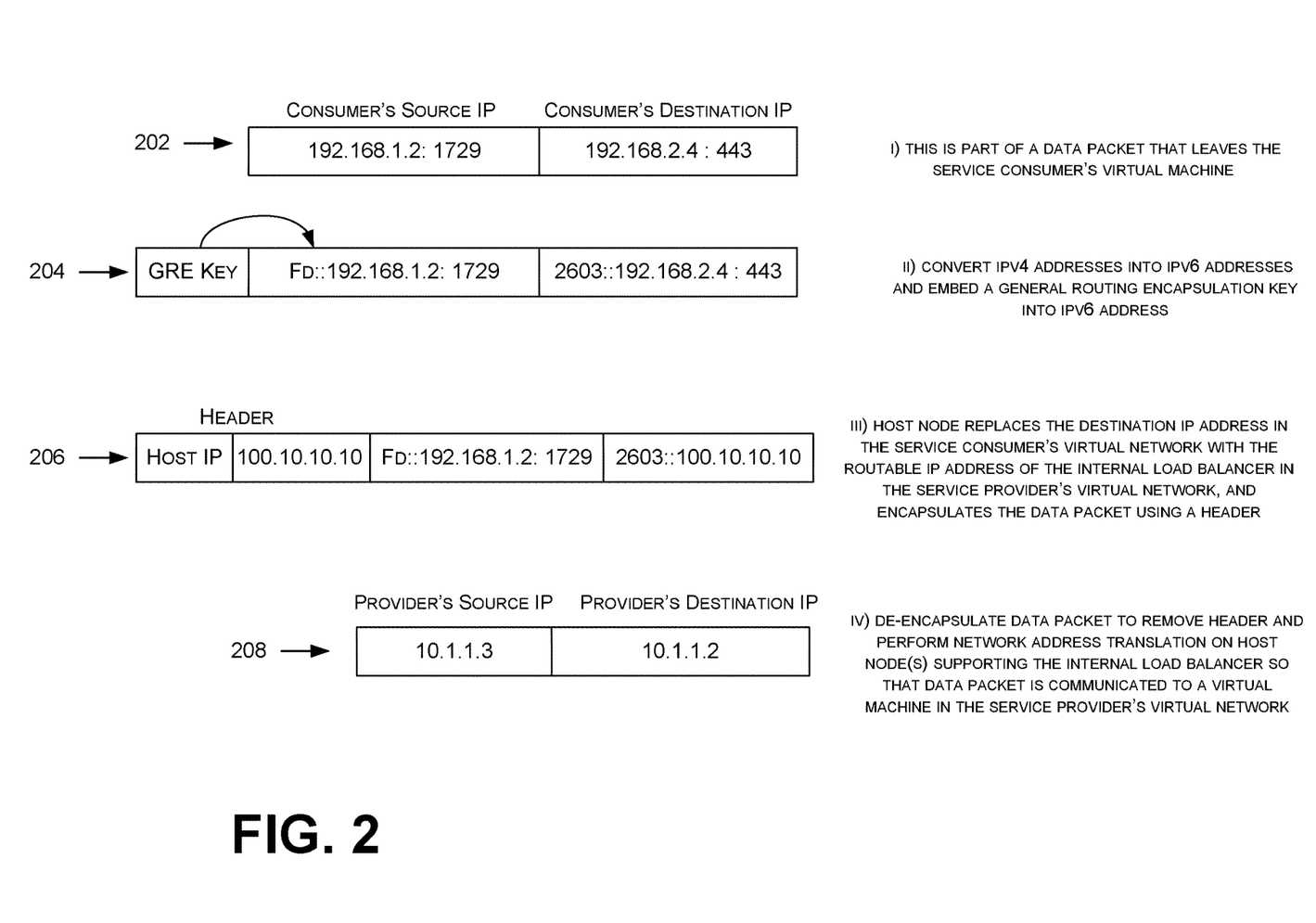
FIG. 2 illustrates example translations that occur in a data packet to implement the techniques described herein.

FIG. 2 illustrates example translations that occur in a data packet to implement the techniques described herein. Reference 202 illustrates an example of at least part of a data packet that leaves the virtual machine 120 in the virtual network of the service consumer 104. The data packet includes a virtual source IP address in the virtual network of the service consumer 104 (e.g., "192.168.1.2") and a source port number (e.g., "1729"). The data packet further includes a virtual destination IP address in the virtual network of the service consumer 104 (e.g., "192.168.2.4") and a destination port number (e.g., "443").

Reference 204 illustrates an example of converting IP addresses in the data packet from IPv4 addresses into IPv6 addresses. Moreover, a general routing encapsulation key (e.g., a GRE Key) that uniquely identifies the virtual network of the service consumer 104 is embedded into the IPv6 address.

Reference 206 illustrates an example of how the host networking components 124 of a host node 122 supporting the virtual machine 120 in the virtual network of the service consumer 104 use a policy (e.g., a condition match/action rule) to replace, as the destination for the data packet, the subnet IP address (e.g., "192.168.2.4") in the virtual network of the service consumer 104 with the routable IP address of the internal load balancer 106 (e.g., "100.10.10.10"). Then, the host networking components 124 can encapsulate the data packet, that includes the IPv6 addresses, with a header (e.g., an IPv4 header), as shown.

The encapsulated data packet can then be communicated, via the cloud-based platform 108 (e.g., dropped to the wire), to the host node 126 supporting the internal load balancer 106 where the data packet can be de-encapsulated, as referenced by 208. For instance, the header (e.g., the outer layer) is removed and network address translation is performed, using a NAT table 128, within the virtual network of the service provider 102. In various examples, the NAT table 128 translates the IPv6 source address of the virtual network of the service consumer 104 into an IPv4 source address in the subnet 116 of the virtual network of the service provider 102 (e.g., "10.1.1.3" as shown in FIG. 1). Moreover, the NAT table 128 translates the routable IP address of the internal load balancer 106 (e.g., "100.10.10.10") into the customer IP address of the internal load balancer 106 and subsequently translates the customer IP address of the internal load balancer 106 into a destination IP address associated with a virtual machine 130 (e.g., "10.1.1.2") as the final destination for the data packet in the virtual network of the service provider 102.

Figure 3:
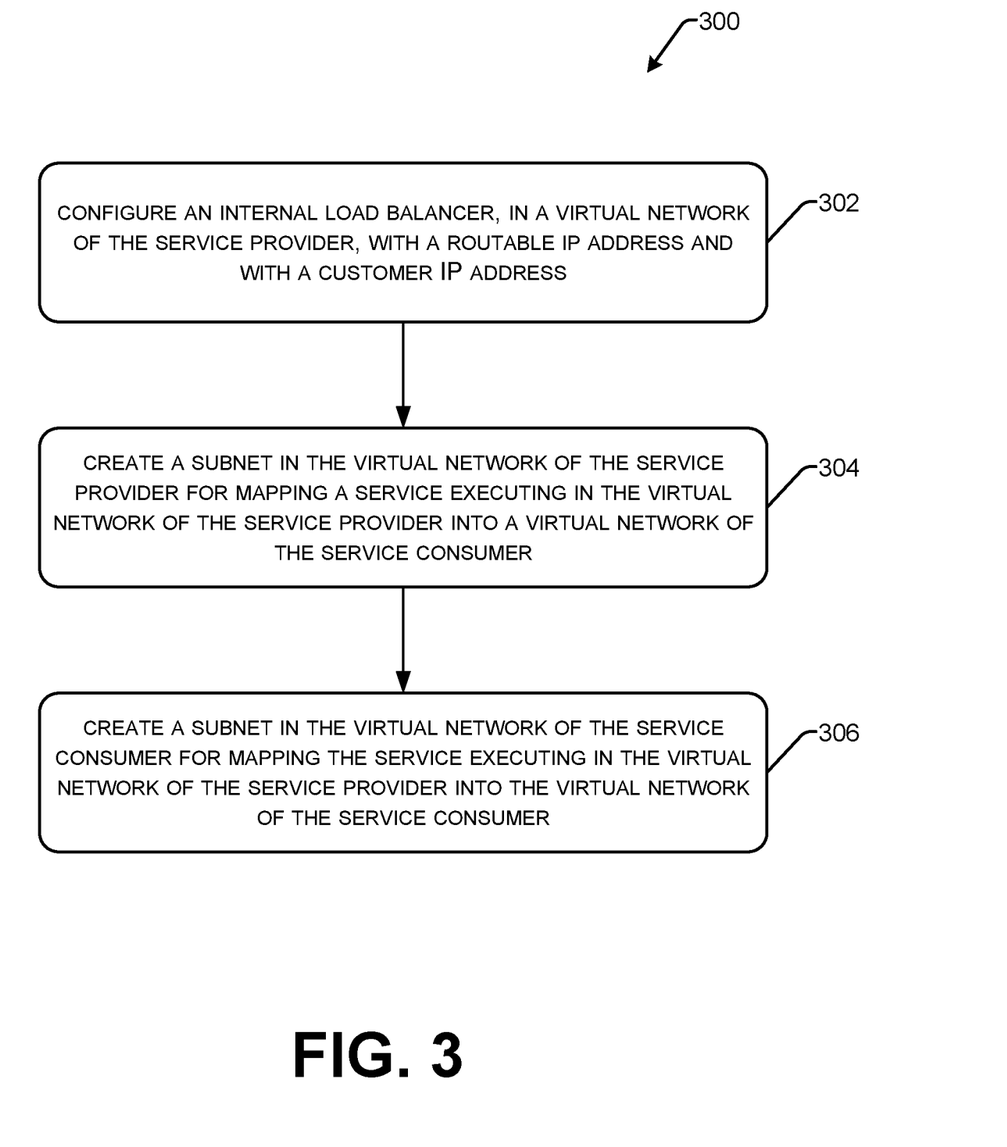
FIG. 3 is a flowchart that illustrates operations for configuring subnets in virtual networks of a service provider and a service consumer so that a service can be mapped from the virtual network of the service provider to the virtual network of the service consumer.
Figure 4:
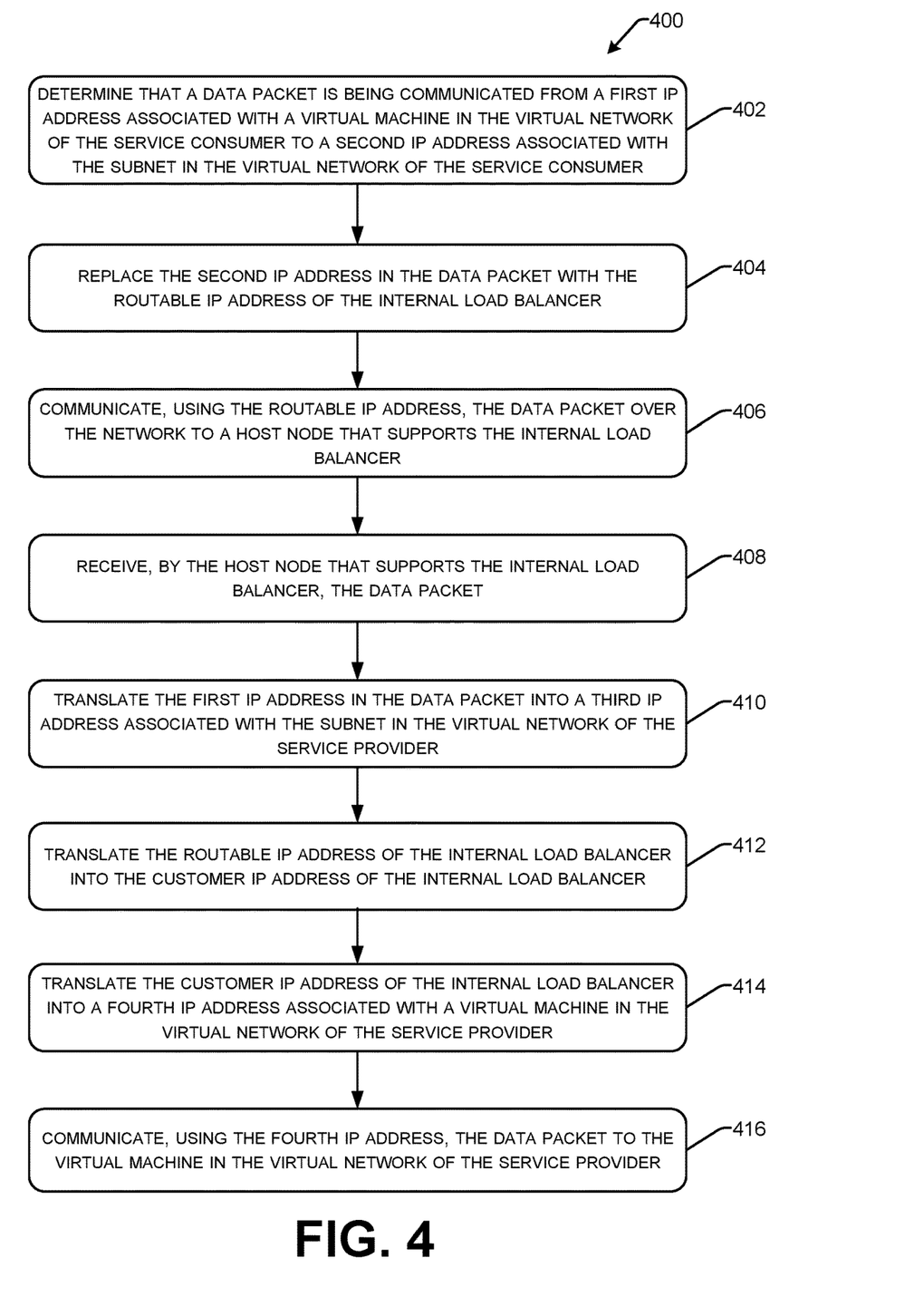
FIG. 4 is a flowchart that illustrates operations for mapping a service executing in a virtual network of a service provider into a virtual network of a service consumer.

FIGS. 3 and 4 each illustrates an example flowchart. It should be understood by those of ordinary skill in the art that the operations of the method(s) disclosed herein are not necessarily presented in any particular order and that performance of some or all of the operations in alternative order(s) is possible and is contemplated. The operations have been presented in the demonstrated order for ease of description and illustration. Operations may be added, omitted, performed together, and/or performed simultaneously, without departing from the scope of the appended claims.

It also should be understood that the illustrated method(s) can end at any time and need not be performed in their entirety. Some or all operations of the method(s), and/or substantially equivalent operations, can be performed by execution of computer-readable instructions included on a computer-storage media, as defined herein. The term "computer-readable instructions," and variants thereof, as used in the description and claims, is used expansively herein to include routines, applications, application modules, program modules, programs, components, data structures, algorithms, and the like.

Thus, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations may be implemented in software, in firmware, in special purpose digital logic, and any combination thereof.

FIG. 3 is a flowchart 300 that illustrates operations for configuring subnets in virtual networks of a service provider and a service consumer so that a service can be mapped from the virtual network of the service provider into the virtual network of the service consumer.

At operation 302, an internal load balancer is configured in the virtual network of the service provider. As described above, a tenant or another party that operates the virtual network may deploy the internal load balancer and assign both a routable IP address and a customer IP address to the internal load balancer. The routable IP address is used by a cloud-based platform to route traffic on a network and the customer IP address is an internal address that is only visible within the virtual network of the service provider.

At operation 304, a subnet in the virtual network of the service provider is created. The subnet is created so that the service executing in the virtual network of the service provider can be mapped into the virtual network of the service consumer.

At operation 306, a subnet in the virtual network of the service consumer is created. This subnet is also created so that the service executing in the virtual network of the service provider can be mapped into the virtual network of the service consumer. This subnet can be created by a tenant that wants to consume a service executing in another virtual network.

As described above, the subnets represent endpoints to a secure communication channel between the virtual networks. Consequently, the virtual machines in the virtual network of the service consumer believe they are sending data packets to, and/or receiving data packets from, an endpoint in their own virtual network when consuming the service. Moreover, the virtual machines in the virtual network of the service provider believe they are sending data packets to, and/or receiving data packets from, an endpoint in their own virtual network when providing the service.

FIG. 4 is a flowchart 400 that illustrates operations for mapping a service executing in a virtual network of a service provider into a virtual network of a service consumer.

At operation 402, it is determined that a data packet is to be communicated from a first IP address (e.g., a consumer-side source virtual IP address) associated with a virtual machine in the virtual network of the service consumer to a second IP address (e.g., a consumer-side destination virtual IP address) associated with the subnet created in the virtual network of the service consumer. This determination can be made by a host node of the cloud-based platform that supports the virtual machine.

At operation 404, the second IP address in the data packet is replaced with the routable IP address (e.g., a physical IP address) of the internal load balancer configured in association with the virtual network of the service provider. This operation can be performed by the host node that supports the virtual machine. In various examples, the host node is made aware of the routable IP address of the internal load balancer because the host node has been instructed to apply a policy (e.g., a condition match/action rule) to translate an IP address associated with the subnet in the virtual network of the service consumer into the routable IP address of the internal load balancer configured in association with the virtual network of the service provider 102. In various examples, the policy, and therefore, the routable IP address, is pushed down to the host node via a publication service (e.g., a publication subscription component) of the cloud-based platform.

At operation 406, the data packet is communicated, using the routable IP address, over the physical network of the cloud-based platform to a host node that supports the internal load balancer.

At operation 408, the data packet is received by the host node that supports the internal load balancer.

At operation 410, the first IP address in the data packet is translated into a third IP address (e.g., a provider-side source virtual IP address) associated with the subnet in the virtual network of the service provider that has been created to map the service executing in the virtual network of the service provider into the virtual network of the service consumer.

At operation 412, the routable IP address of the internal load balancer in the data packet is translated into the customer IP address of the internal load balancer.

At operation 414, the customer IP address of the internal load balancer is translated into a fourth IP address (e.g., a server-side destination virtual IP address) associated with a virtual machine in the virtual network of the service provider. As described above, the virtual machine may be selected, amongst multiple virtual machines, by the internal load balancer in association with a scaling and/or load balancing function.

At operation 416, the data packet is communicated, using the fourth IP address, to the virtual machine in the virtual network of the service provider.

Figure 5:
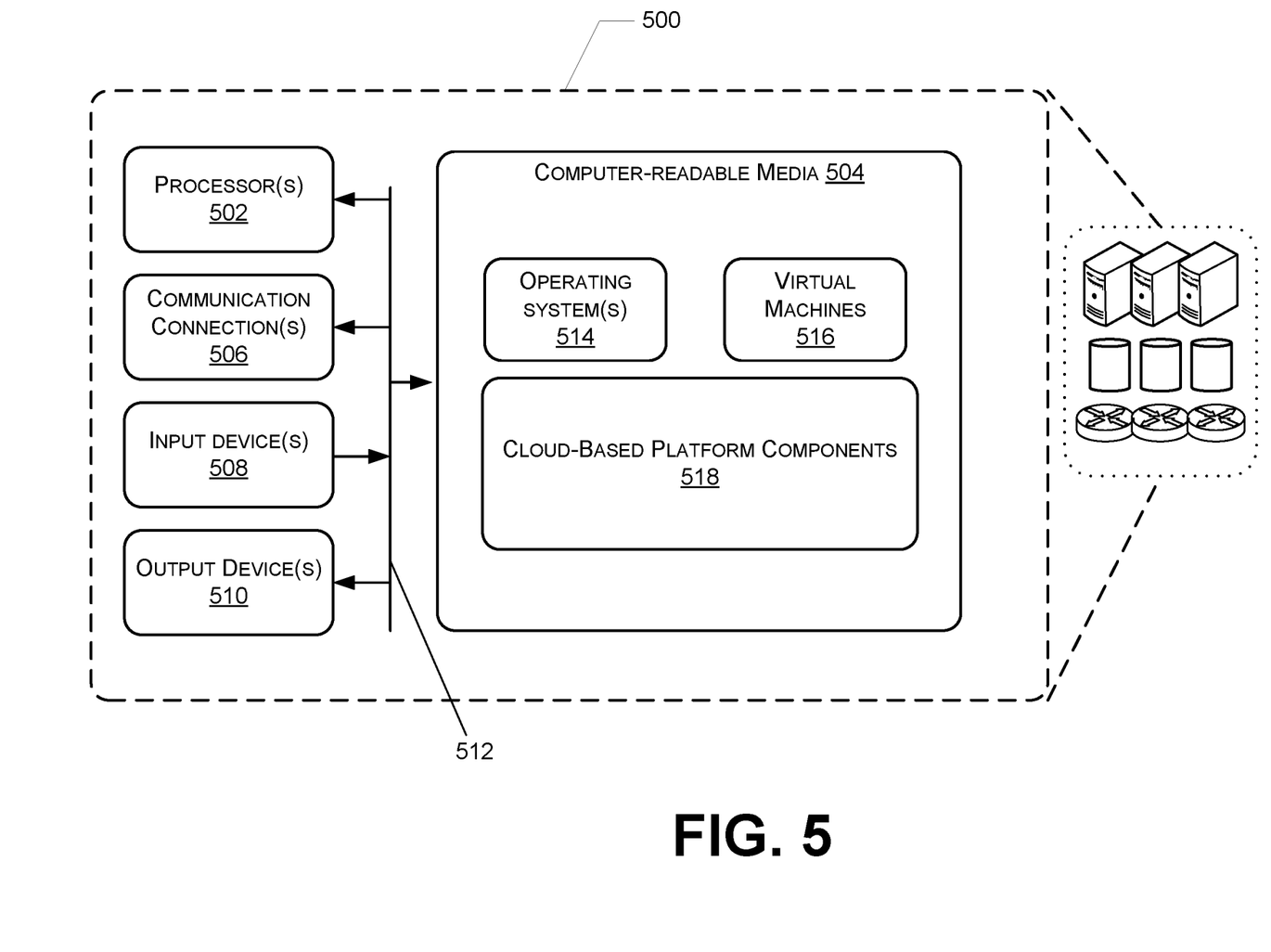
FIG. 5 is a block diagram of an example computing system usable to implement various aspects of the present disclosure.

FIG. 5 is a block diagram of an example computing system 500 usable to implement various aspects of the present disclosure. The computing system 500 may be deployed in a shared network environment, including in a datacenter, a cloud computing environment, or other network of computing devices. In one example configuration, the computing system 500 comprises at least one processor 502 and computer-readable media 504. The computing system 500 also contains communication connection(s) 506 that allow communications with various other systems. The computing system 500 may also include one or more input devices 508, such as a keyboard, mouse, pen, voice input device, touch input device, etc., and/or one or more output devices 510, such as a display (including a touch-screen display), speakers, printer, etc. coupled communicatively to the processor(s) 502 and the computer-readable media 504 via connections 512.

In the illustrated example, computer-readable media 504 stores operating system(s) 514, which provide basic system functionality to virtual machines 516 (which may be the same as or similar to one or more of virtual machines described above) and/or other cloud-based platform components 518 (e.g., networking resource provider, a publication service, a networking switch, a Virtual Filtering Platform, APIs, etc.).

The operations described herein can be implemented via computer-executable instructions stored on one or more computer storage media that, when executed by one or more processors, enable the one or more processors to perform the operations. Generally, computer-executable instructions include routines, programs, objects, modules, components, data structures, and the like that perform particular functions or implement particular abstract data types.

According to various examples, the computing systems described herein includes one or more devices, such as servers, storage devices, and other cloud-based platform devices. Computer-readable media 504 stores computer-executable instructions that are loadable and executable by one or more processor(s), as well as data generated during execution of, and/or usable in conjunction with, these programs. In the illustrated example, computer-readable media stores operating system instances, which provide basic system functionality to applications stored thereon. One or more of these components, including the operating systems, may be instantiated as virtual machines, containers, or as some other type of virtualized instantiation.

Processor(s) 502 may include one or more single-core processing unit(s), multi-core processing unit(s), central processing units (CPUs), graphics processing units (GPUs), general-purpose graphics processing units (GPGPUs), or hardware logic components configured, e.g., via specialized programming from modules or application program interfaces (APIs), to perform functions described herein. In alternative examples one or more functions of the present disclosure may be performed or executed by, and without limitation, hardware logic components including Field-Programmable Gate Arrays (FPGAs), Application-Specific Integrated Circuits (ASICs), Application-Specific Standard Products (ASSPs), System-on-a-Chip Systems (SOCs), Complex Programmable Logic Devices (CPLDs), Digital Signal Processing unit(s) (DSPs), and other types of customized processing unit(s). For example, a processing unit configured to perform one or more of the functions described herein may represent a hybrid device that includes a CPU core embedded in an FPGA fabric. These or other hardware logic components may operate independently or, in some instances, may be driven by a CPU. In some examples, examples of the computing systems may include a plurality of processing units of multiple types. Different processing units may have different execution models, e.g., as is the case for graphics processing units (GPUs) and central processing units (CPUs).

Depending on the configuration and type of computing device used, computer-readable media include volatile memory (such as random access memory (RAM)) and/or non-volatile memory (such as read-only memory (ROM), flash memory, 3D XPoint, resistive RAM, etc.). The computer-readable media can also include additional removable storage and/or non-removable storage including, but not limited to, SSD (e.g., flash memory), HDD (Hard Disk Drive) storage or other type of magnetic storage, optical storage, and/or other storage that can provide non-volatile storage of computer-executable instructions, data structures, program modules, and other data for computing systems.

Computer-readable media can, for example, represent computer memory, which is a form of computer storage media. Computer-readable media includes at least two types of computer-readable media, namely computer storage media and communications media. Computer storage media includes volatile and non-volatile, removable and non-removable media implemented in any process or technology for storage of information such as computer-executable instructions, data structures, programming modules, or other data. Computer storage media includes, but is not limited to, phase change memory (PRAM), resistive RAM, 3D XPoint non-volatile memory, static random-access memory (SRAM), dynamic random-access memory (DRAM), other types of random-access memory (RAM), read-only memory (ROM), electrically erasable programmable read-only memory (EEPROM), flash memory or other memory technology, compact disk read-only memory (CD-ROM), digital versatile disks (DVD) or other optical storage, magnetic cassettes, magnetic tape, magnetic disk storage or other magnetic storage devices, or any other medium that can be used to store information for access and retrieval by a computing device. In contrast, communication media can embody computer-executable instructions, data structures, program modules, or other data in a modulated data signal, such as a carrier wave, or other transmission mechanism. As defined herein, computer storage media does not include communication media.

Illustrative Configurations

The following clauses described multiple possible configurations for implementing the features described in this disclosure. The various configurations described herein are not limiting nor is every feature from any given configuration required to be present in another configuration. Any two or more of the configurations may be combined together unless the context clearly indicates otherwise. As used herein in this document "or" means and/or. For example, "A or B" means A without B, B without A, or A and B. As used herein, "comprising" means including listed all features and potentially including addition of other features that are not listed.

The disclosure presented herein also encompasses the subject matter set forth in the following clauses.

Example Clause A, a method for mapping a service executing in a virtual network of a service provider into a virtual network of a service consumer, the method comprising: creating a subnet, in the virtual network of the service provider, for mapping the service executing in the virtual network of the service provider into the virtual network of the service consumer; receiving a data packet at a host node of a cloud-based platform that supports an internal load balancer associated with the virtual network of the service provider, wherein the data packet is routed to the host node using a routable Internet Protocol (IP) address assigned to the internal load balancer; translating, by the host node, a first source IP address in the data packet into a second source IP address, wherein the first source IP address is associated with a virtual machine in the virtual network of the service consumer and the second source IP address is associated with the subnet; translating, by the host node, the routable IP address in the data packet into a destination IP address associated with a virtual machine in the virtual network of the service provider; and communicating, by the host node using the destination IP address, the data packet to the virtual machine in the virtual network of the service provider, wherein the data packet indicates the second source IP address as a source.

Example Clause B, the method of Example Clause A, further comprising: creating a subnet, in the virtual network of the service consumer, for mapping the service executing in the virtual network of the service provider into the virtual network of the service consumer; determining, by another host node of the cloud-based platform supporting the virtual network of the service consumer, that the data packet is being communicated from the first source IP address to another destination IP address associated with the subnet in the virtual network of the service consumer; replacing, by the other host node, the other destination IP address in the data packet with the routable IP address; and communicating, by the other host node using the routable IP address, the data packet over a network to the host node.

Example Clause C, the method of Example Clause B, wherein the first source IP address and the other destination IP address comprise Internet Protocol version 4 (IPv4) addresses, and the method further comprises converting, by the other host node, the IPv4 addresses into Internet Protocol version 6 (IPv6) addresses.

Example Clause D, the method of Example Clause B or Example Clause C, further comprising: encapsulating, by the other host node, the data packet; embedding, by the other host node, a general routing encapsulation key that uniquely identifies the virtual network of the service consumer in the data packet; and de-encapsulating, by the host node, the data packet.

Example Clause E, the method of any one of Example Clauses B through D, further comprising: determining that a reply data packet is communicated from the destination IP address to the second source IP address; translating, by the host node, the destination IP address in the reply data packet into the other destination IP address associated with the subnet in the virtual network of the service consumer; translating, by the host node, the second source IP address in the reply data packet into the first source IP address associated with the virtual machine in the virtual network of the service consumer; and communicating, by the host node using the first source IP address as a destination, the reply data packet to the virtual machine in the virtual network of the service consumer.

Example Clause F, the method of Example Clause E, wherein translating the second source IP address into the first source IP address uses a general routing encapsulation key to identify the virtual network of the service consumer.

Example Clause G, the method of any one of Example Clauses A through F, wherein the internal load balancer selects the virtual machine in the virtual network of the service provider as a final destination for the data packet.

Example Clause H, the method of any one of Example Clauses A through G, wherein translating the routable IP address into the destination IP address associated with the virtual machine in the virtual network of the service provider comprises: translating the routable IP address into a customer IP address associated with the internal load balancer; and subsequently translating the customer IP address into the destination IP address.

Example Clause I, the method of any one of Example Clauses A through H, further comprising translating, by the host node, an original destination port number in the data packet into a selected destination port number that is selected by the internal load balancer, the selected destination port number being associated with the virtual machine in the virtual network of the service provider.

Example Clause J, a system comprising: one or more processors; and computer-readable media storing instructions that, when executed by the one or more processors, cause the system to: create a subnet, in a virtual network of a service provider, for mapping a service into a virtual network of a service consumer; receive a data packet at a host node of a cloud-based platform that supports an internal load balancer associated with the virtual network of the service provider, wherein the data packet is routed to the host node using a routable Internet Protocol (IP) address assigned to the internal load balancer; translate, by the host node, a first source IP address in the data packet into a second source IP address, wherein the first source IP address is associated with a virtual machine in the virtual network of the service consumer and the second source IP address is associated with the subnet; translate, by the host node, the routable IP address in the data packet into a destination IP address associated with a virtual machine in the virtual network of the service provider; and communicate, by the host node using the destination IP address, the data packet to the virtual machine in the virtual network of the service provider, wherein the data packet indicates the second source IP address as a source.

Example Clause K, the system of Example Clause J, wherein the instructions further cause the system to: create a corresponding subnet, in the virtual network of the service consumer, for mapping the service into the virtual network of the service consumer; determine, by another host node of the cloud-based platform supporting the virtual network of the service consumer, that the data packet is being communicated from the first source IP address to another destination IP address associated with the corresponding subnet; replace, by the other host node, the other destination IP address in the data packet with the routable IP address; and communicate, by the other host node using the routable IP address, the data packet over a network to the host node.

Example Clause L, the system of Example Clause K, wherein the first source IP address and the other destination IP address comprise Internet Protocol version 4 (IPv4) addresses, and the method further comprises converting, by the other host node, the IPv4 addresses into Internet Protocol version 6 (IPv6) addresses.

Example Clause M, the system of Example Clause K or Example Clause L, wherein the instructions further cause the system to: encapsulate, by the other host node, the data packet; embed, by the other host node, a general routing encapsulation key that uniquely identifies the virtual network of the service consumer in the data packet; and de-encapsulate, by the host node, the data packet.

Example Clause N, the system of any one of Example Clauses J through M, wherein the internal load balancer selects the virtual machine in the virtual network of the service provider as a final destination for the data packet.

Example Clause O, the system of any one of Example Clauses J through N, wherein translating the routable IP address in the data packet into the destination IP address comprises: translating the routable IP address into a customer IP address of the internal load balancer; and subsequently translating the customer IP address into the destination IP address.

Example Clause P, the system of any one of Example Clauses J through O, wherein the instructions further cause the system to translate, by the host node, an original destination port number in the data packet into a selected destination port number selected by the internal load balancer, the selected destination port number being associated with the virtual machine in the virtual network of the service provider.

Example Clause Q, a method comprising: receiving a data packet at a host node of a cloud-based platform that supports an internal load balancer associated with a virtual network of a service provider, wherein the data packet is routed to the host node using a routable Internet Protocol (IP) address assigned to the internal load balancer; translating, by the host node, a first source IP address in the data packet into a second source IP address associated with a subnet in the virtual network of the service provider, the subnet configured to map a service executing in the virtual network of the service provider into a virtual network of a service consumer; translating, by the host node, the routable address in the data packet into a destination IP address associated with a virtual machine in the virtual network of the service provider; and communicating, by the host node using the destination IP address, the data packet to the virtual machine in the virtual network of the service provider, wherein the data packet indicates the second source IP address as a source.

Example Clause R, the method of Example Clause Q, wherein the internal load balancer selects the virtual machine in the virtual network of the service provider as a final destination for the data packet.

Example Clause S, the method of Example Clause Q or Example Clause R, wherein translating the routable IP address in the data packet into the destination IP address comprises: translating the routable IP address into a customer IP address of the internal load balancer; and subsequently translating the customer IP address into the destination IP address.

Example Clause T, the method of any one of Example Clauses Q through S, further comprising translating, by the host node, an original destination port number in the data packet into a selected destination port number selected by the internal load balancer, the selected destination port number being associated with the virtual machine in the virtual network of the service provider.

Conclusion

For ease of understanding, the processes discussed in this disclosure are delineated as separate operations represented as independent blocks. However, these separately delineated operations should not be construed as necessarily order dependent in their performance. The order in which the process is described is not intended to be construed as a limitation, and any number of the described process blocks may be combined in any order to implement the process or an alternate process. Moreover, it is also possible that one or more of the provided operations is modified or omitted.

Although the subject matter has been described in language specific to structural features and/or methodological acts, it is to be understood that the subject matter defined in the appended claims is not necessarily limited to the specific features or acts described above. Rather, the specific features and acts are disclosed as example forms of implementing the claims.

The terms "a," "an," "the" and similar referents used in the context of describing the invention (especially in the context of the following claims) are to be construed to cover both the singular and the plural unless otherwise indicated herein or clearly contradicted by context. The terms "based on," "based upon," and similar referents are to be construed as meaning "based at least in part" which includes being "based in part" and "based in whole" unless otherwise indicated or clearly contradicted by context.

It should be appreciated that any reference to "first," "second," "third", etc. elements within the Summary and/or Detailed Description is not intended to and should not be construed to necessarily correspond to any reference of "first," "second," etc. elements of the claims. Rather, unless otherwise specified, any use of "first," "second," and "third" within the Summary and/or Detailed Description may be used to distinguish between different instances of a same or a similar element (e.g., different IP addresses, different virtual machines, etc.).

Certain configurations are described herein, including the best mode known to the inventors for carrying out the invention. Of course, variations on these described configurations will become apparent to those of ordinary skill in the art upon reading the foregoing description. Skilled artisans will know how to employ such variations as appropriate, and the configurations disclosed herein may be practiced otherwise than specifically described. Accordingly, all modifications and equivalents of the subject matter recited in the claims appended hereto are included within the scope of this disclosure. Moreover, any combination of the above-described elements in all possible variations thereof is encompassed by the invention unless otherwise indicated herein or otherwise clearly contradicted by context.

What is claimed is:

1. A method for mapping a service executing in a virtual network of a service provider into a virtual network of a service consumer, the method comprising:
    creating a subnet, in the virtual network of the service provider, for mapping the service executing in the virtual network of the service provider into the virtual network of the service consumer, wherein the subnet in the virtual network of the service provider comprises a collection of Internet Protocol (IP) addresses;
    receiving a data packet at a host node of a cloud-based platform that supports an internal load balancer configured by the virtual network of the service provider to balance load on resources within the virtual network of the service provider, wherein the data packet is routed to the host node using a routable IP address that is assigned to the internal load balancer and that is used by networking components of the cloud-based platform to route data traffic to and from the virtual network of the service provider over a physical network;
    translating, by the host node that supports the internal load balancer configured by the virtual network of the service provider, a first source IP address in the data packet into a second source IP address, wherein the first source IP address is associated with a virtual machine in the virtual network of the service consumer and the second source IP address is associated with the subnet;
    translating, by the host node that supports the internal load balancer configured by the virtual network of the service provider, the routable IP address in the data packet into a destination IP address associated with a virtual machine in the virtual network of the service provider; and
    communicating, by the host node that supports the internal load balancer configured by the virtual network of the service provider and using the destination IP address, the data packet to the virtual machine in the virtual network of the service provider, wherein the data packet indicates the second source IP address as a source.

2. The method of claim 1, further comprising:
    creating a subnet, in the virtual network of the service consumer, for mapping the service executing in the virtual network of the service provider into the virtual network of the service consumer;
    determining, by another host node of the cloud-based platform supporting the virtual network of the service consumer, that the data packet is being communicated from the first source IP address to another destination IP address associated with the subnet in the virtual network of the service consumer;

replacing, by the another host node, the another destination IP address in the data packet with the routable IP address; and communicating, by the another host node using the routable IP address, the data packet over the physical network to the host node.

3. The method of claim 2, wherein the first source IP address and the another destination IP address comprise Internet Protocol version 4 (IPv4) addresses, and the method further comprises converting, by the another host node, the IPv4 addresses into Internet Protocol version 6 (IPv6) addresses.

4. The method of claim 2, further comprising:
encapsulating, by the another host node, the data packet;
embedding, by the another host node, a general routing encapsulation key that uniquely identifies the virtual network of the service consumer in the data packet; and
de-encapsulating, by the host node, the data packet.

5. The method of claim 2, further comprising:
determining that a reply data packet is communicated from the destination IP address to the second source IP address;
translating, by the host node, the destination IP address in the reply data packet into the another destination IP address associated with the subnet in the virtual network of the service consumer;
translating, by the host node, the second source IP address in the reply data packet into the first source IP address associated with the virtual machine in the virtual network of the service consumer; and
communicating, by the host node using the first source IP address as a destination, the reply data packet to the virtual machine in the virtual network of the service consumer.

6. The method of claim 5, wherein translating the second source IP address into the first source IP address uses a general routing encapsulation key to identify the virtual network of the service consumer.

7. The method of claim 1, wherein the internal load balancer selects the virtual machine in the virtual network of the service provider as a final destination for the data packet.

8. The method of claim 1, wherein translating the routable IP address into the destination IP address associated with the virtual machine in the virtual network of the service provider comprises:
translating the routable IP address into a customer IP address associated with the internal load balancer; and
subsequently translating the customer IP address into the destination IP address.

9. The method of claim 1, further comprising translating, by the host node, an original destination port number in the data packet into a selected destination port number that is selected by the internal load balancer, the selected destination port number being associated with the virtual machine in the virtual network of the service provider.

10. The method of claim 1, wherein the internal load balancer is assigned a customer IP address in addition to the routable IP address, the customer IP address only being visible to virtual machines within the virtual network of the service provider.

11. A system comprising:
one or more processors; and
computer-readable media storing instructions that, when executed by the one or more processors, cause the system to:
create a subnet, in a virtual network of a service provider, for mapping a service into a virtual network of a service consumer, wherein the subnet in the virtual network of the service provider comprises a collection of Internet Protocol (IP) addresses;
receive a data packet at a host node of a cloud-based platform that supports an internal load balancer configured by the virtual network of the service provider to balance load on resources within the virtual network of the service provider, wherein the data packet is routed to the host node using a routable IP address that is assigned to the internal load balancer and that is used by networking components of the cloud-based platform to route data traffic to and from the virtual network of the service provider over a physical network;
translate, by the host node that supports the internal load balancer configured by the virtual network of the service provider, a first source IP address in the data packet into a second source IP address, wherein the first source IP address is associated with a virtual machine in the virtual network of the service consumer and the second source IP address is associated with the subnet;
translate, by the host node that supports the internal load balancer configured by the virtual network of the service provider, the routable IP address in the data packet into a destination IP address associated with a virtual machine in the virtual network of the service provider; and
communicate, by the host node that supports the internal load balancer configured by the virtual network of the service provider and using the destination IP address, the data packet to the virtual machine in the virtual network of the service provider, wherein the data packet indicates the second source IP address as a source.

12. The system of claim 11, wherein the instructions further cause the system to:
create a corresponding subnet, in the virtual network of the service consumer, for mapping the service into the virtual network of the service consumer;
determine, by another host node of the cloud-based platform supporting the virtual network of the service consumer, that the data packet is being communicated from the first source IP address to another destination IP address associated with the corresponding subnet;
replace, by the another host node, the another destination IP address in the data packet with the routable IP address; and
communicate, by the another host node using the routable IP address, the data packet over the physical network to the host node.

13. The system of claim 12, wherein the first source IP address and the another destination IP address comprise Internet Protocol version 4 (IPv4) addresses, and the method further comprises converting, by the another host node, the IPv4 addresses into Internet Protocol version 6 (IPv6) addresses.

14. The system of claim 12, wherein the instructions further cause the system to:
encapsulate, by the another host node, the data packet;
embed, by the another host node, a general routing encapsulation key that uniquely identifies the virtual network of the service consumer in the data packet; and
de-encapsulate, by the host node, the data packet.

15. The system of claim 11, wherein the internal load balancer selects the virtual machine in the virtual network of the service provider as a final destination for the data packet.

16. The system of claim 11, wherein translating the routable IP address in the data packet into the destination IP address comprises:
   translating the routable IP address into a customer IP address of the internal load balancer; and
   subsequently translating the customer IP address into the destination IP address.

17. The system of claim 11, wherein the instructions further cause the system to translate, by the host node, an original destination port number in the data packet into a selected destination port number selected by the internal load balancer, the selected destination port number being associated with the virtual machine in the virtual network of the service provider.

18. A method comprising:
   receiving a data packet at a host node of a cloud-based platform that supports an internal load balancer configured by a virtual network of a service provider, wherein the data packet is routed to the host node using a routable Internet Protocol (IP) address that is assigned to the internal load balancer and that is used by networking components of the cloud-based platform to route data traffic to and from the virtual network of the service provider over a physical network;
   translating, by the host node that supports the internal load balancer configured by the virtual network of the service provider, a first source IP address in the data packet into a second source IP address associated with a subnet in the virtual network of the service provider, the subnet comprising a collection of IP addresses useable to map a service executing in the virtual network of the service provider into a virtual network of a service consumer;
   translating, by the host node that supports the internal load balancer configured by the virtual network of the service provider, the routable address in the data packet into a destination IP address associated with a virtual machine in the virtual network of the service provider; and
   communicating, by the host node that supports the internal load balancer configured by the virtual network of the service provider and using the destination IP address, the data packet to the virtual machine in the virtual network of the service provider, wherein the data packet indicates the second source IP address as a source.

19. The method of claim 18, wherein the internal load balancer selects the virtual machine in the virtual network of the service provider as a final destination for the data packet.

20. The method of claim 18, wherein translating the routable IP address in the data packet into the destination IP address comprises:
   translating the routable IP address into a customer IP address of the internal load balancer; and
   subsequently translating the customer IP address into the destination IP address.

\* \* \* \* \*